(12) United States Patent
Schmidt et al.

(10) Patent No.: US 11,818,780 B2
(45) Date of Patent: Nov. 14, 2023

(54) COMMUNICATION SYSTEM LINK ESTABLISHMENT

(71) Applicant: IPCom GmbH & Co. KG, Pullach (DE)

(72) Inventors: Andreas Schmidt, Braunschweig (DE); Achim Luft, Braunschweig (DE); Maik Bienas, Schöppenstedt (DE); Martin Hans, Bad Salzdetfurth (DE)

(73) Assignee: IPCom GmbH & Co. KG, Pullach (DE)

( * ) Notice: Subject to any disclaimer, the term of this patent is extended or adjusted under 35 U.S.C. 154(b) by 462 days.

(21) Appl. No.: 17/265,822

(22) PCT Filed: Aug. 8, 2019

(86) PCT No.: PCT/EP2019/071294
§ 371 (c)(1),
(2) Date: Feb. 4, 2021

(87) PCT Pub. No.: WO2020/030730
PCT Pub. Date: Feb. 13, 2020

(65) Prior Publication Data
US 2021/0235525 A1    Jul. 29, 2021

(30) Foreign Application Priority Data
Aug. 10, 2018  (EP) .................................... 18188486

(51) Int. Cl.
*H04W 76/14*    (2018.01)
*H04W 4/02*     (2018.01)
*H04W 40/20*    (2009.01)
*H04W 40/24*    (2009.01)

(52) U.S. Cl.
CPC ........... *H04W 76/14* (2018.02); *H04W 4/025* (2013.01); *H04W 40/20* (2013.01); *H04W 40/24* (2013.01)

(58) Field of Classification Search
CPC ..... H04W 76/14; H04W 4/025; H04W 40/20; H04W 40/24
See application file for complete search history.

(56) References Cited

U.S. PATENT DOCUMENTS

| | | | |
|---|---|---|---|
| 8,917,708 B2 | 12/2014 | Venkatachalam et al. | |
| 2014/0301270 A1 | 10/2014 | Johnsson et al. | |
| 2016/0227365 A1 | 8/2016 | Siomina et al. | |
| 2018/0310205 A1* | 10/2018 | Frenger | H04W 76/19 |
| 2019/0317846 A1* | 10/2019 | Liu | G06F 8/60 |

OTHER PUBLICATIONS

3GPP Draft; TR 38874 v040-tr, Aug. 9, 2018 3rd Generation Partnership Project (3GPP), Mobile Competence Centre ; 650, route des Lucioles ; F-06921 Sophia-Antipolis Cedex ; France XP051521678.

* cited by examiner

*Primary Examiner* — Gerald Johnson
(74) *Attorney, Agent, or Firm* — PROI Intellectual Property US; Klaus Michael Schmid

(57) ABSTRACT

The present invention provides a method of establishing a wireless communication link between two infrastructure nodes in a wireless communication system, the method comprising at a user equipment, UE, device receiving a link establishment request message transmitted by a first node; obtaining information relating to a position of the first node; and transmitting a message to a second node informing the second node of the position of the first node to assist in establishing the link between the first and second nodes.

20 Claims, 4 Drawing Sheets

COMMUNICATION SYSTEM LINK ESTABLISHMENT

The present invention relates to a method for setting up a backhaul link in a mobile communication system. In particular, the invention relates to the establishment of a wireless connection between two nodes in a wireless communication system. The invention provides a method whereby a mobile terminal (user equipment, UE) can be utilized to assist in the connection setup procedure for a direction oriented wireless link between two infrastructure nodes.

A dense deployment of infrastructure nodes is vital to provide the high data rate and low latency demands for upcoming 5G systems.

An example of a cellular communication system according to LTE is shown in FIG. 4-1 of 3GPP technical standard 36.300 V 14.4.0. The wireless connection between the base stations (eNBs) and the mobile terminal (UE) is generally referred to as an "access link" ("LTE Uu" in LTE terminology). The interfaces on the infrastructure side are generally referred to as "backhaul links".

In the figure referred to, the various base stations are connected with the mobile network operator's (MNO's) core network (CN) via an S1 interface. The CN is shown in the figure simplified as one main entity which is the single end point of the S1 interface of a base station whereas a complete CN consists of multiple connected entities (such as a mobility management entity (MME) responsible for handling of control plane traffic, and a serving gateway (S-GW) responsible for handling of user plane traffic). An X2 interface is connecting the various base stations logically with each other. In some deployments, an X2 connection may physically be routed through the CN.

An S1 connection (with or without a piggy-backed X2 connection) is often realized as a wired connection (e.g., using fibre optics between the MNO's core network and the base station site). Said wired connections are quite expensive for the MNO and inflexible. However, depending on the scenario, deployments exist where such S1 and/or X2 connections are realized as wireless, highly directive line-of-sight connections (e.g., between two base station towers where line-of-sight is prevalent) using an antenna system that is distinct from the antennas serving the UEs. In most cases the antenna system used for this type of connection is a static parabolic reflector (i.e. a dish) that is adjusted manually by human personnel when the base station site (or relay node site) is being setup. This solution may be less expensive in some scenarios, but it is inflexible still.

3GPP Rel-10 introduces the concept of relay nodes, RN, (as part of "LTE-Advanced"). A relay node as defined by 3GPP is a low power base station that may provide enhanced coverage and capacity at cell edges or in hot-spot areas. The relay node is served by a donor eNB (DeNB) via a radio interface, LTE Un, which is a modification of the LTE Uu air interface. Hence, in the donor cell the radio resources are shared between UEs served directly by the DeNB and relay nodes. This kind of relay node has to be positioned within the DeNB's coverage area as a relay node residing outside the DeNB's coverage could not connect to the DeNB and thus would not have a backhaul link.

Type 1 LTE relay nodes control their cells with their own cell identity including the transmission of their own synchronisation signals and reference symbols. Type 1 relays appear as if they are an eNB to UEs. This ensures backwards compatibility. When the relay node is of Type 1, there is a high risk for interference in the relay node, when receiving on Uu and transmitting on Un at the same time (or vice-versa). This can be avoided through time division between Uu and Un, or having different locations of the transmitter and receiver. There are two further sub-types within this category:

Type 1.a: These LTE relay nodes are outband RNs which have the same properties as the basic Type 1 relay nodes, but they can transmit and receive at the same time, i.e. full duplex.

Type 1.b: This form of LTE relay node is an inband form. They have a sufficient isolation between the antennas used for the BS-RN and the RN-UE links. This isolation can be achieved by antenna spacing and directivity as well as specialised digital signal processing techniques, although there are cost impacts of doing this. The performance of these RNs is anticipated to be similar to that of femtocells.

Type 2 LTE relay nodes do not have their own cell identity and look just like the main cell. Any UE in range is not able to distinguish a relay from the main eNB within the cell. Control information can be transmitted from the eNB and user data from the LTE relay.

Table 1 gives an overview of the different types of LTE Relay Nodes as defined in 3GPP TR 36.814 (Release 9). The main differentiator between a type 1 and a type 2 relay node is whether a given relay node disseminates its own cell identity, synchronisation signals and reference symbols.

TABLE 1

| LTE Relay Node | Own Cell-ID | Duplex Mode |
|---|---|---|
| Type 1 | Yes | Inband, Half Duplex |
| Type 1.a | Yes | Outband, Full Duplex |
| Type 1.b | Yes | Inband, Full Duplex |
| Type 2 | No | Inband, Full Duplex |

The RN start-up procedure is a two-step process which is based on the normal UE attachment procedure. In the first step, the RN connects as a normal UE to an eNB in order to get all the information it needs to connect as a relay in the second step. This may be done to any eNB, regardless of whether it has DeNB capabilities or not. The main purpose is to connect to the O&M (operation and maintenance) centre in order to obtain the list of initial parameters, which comprises most importantly the list of DeNBs. Then the RN detaches and triggers the next step, the attachment for RN operation. In this second attachment, the UE selects one of the DeNBs provided by the O&M. Authentication and security is repeated because now the RN attaches for relay operation. Potential demand and structure for the special subframes are negotiated and finally the O&M can complete the RN configuration. After the setup of S1/X2 connections, the RN can start operating. A 3GPP Rel-10 RN will support to a large extent the same functionalities as the eNB. However, the DeNB will be responsible for CN node (MME) selection.

In upcoming 5G cellular communication systems the frequency range for the access link will comprise frequency bands below 6 GHz as well as above 6 GHz. The latter requires beamforming of radio signals to extend the otherwise limited coverage area. It is envisaged that future base stations and/or relay nodes (infrastructure nodes) are therefore equipped with antenna systems that allow concentration of radio signals towards a certain spot or into a certain direction. These antenna systems are known as "phased arrays". Usually, concentrated radio transmissions come along with a reduction of the respective radio beam's width. A directed antenna beam usually consists of a strong main lobe pointing in the desired direction of signal reinforcement and at least one side lobe with much less intensity. In some deployments, beam forming techniques are also utilized in current cellular communication systems operating in "legacy" frequency bands below 6 GHz.

In this context, infrastructure nodes may be base stations, relay nodes, Remote Radio Heads, or any combination thereof. In case a functional network node split into Central Unit (CU) and Distributed Unit (DU) is defined, as currently discussed in 3GPP for the upcoming 5G Radio Access Network (RAN), an infrastructure node may also be represented by a sub set of a base station, such as a Central Unit (CU) or a Distributed Unit (DU).

In RRC_CONNECTED an RRC connection has been established for the transfer of data to/from the UE and mobility of a UE is network controlled and UE assisted. That means based on measurements collected by and received from the UE the infrastructure side may trigger handover from one base station (eNB) to another.

In RRC_IDLE mobility is solely under control of the UE. That means based on measurements collected by the UE, the UE itself continuously checks whether there are radio cells around that are better suited for the UE to camp on. A UE in RRC_IDLE is required to inform the infrastructure from time to time about changes of its tracking area (in order to guarantee reachability in case of paging).

Details about the UE states in LTE and state transitions (including inter-RAT aspects) can be found in section 4.2 of 3GPP TS 36.331.

A UE residing in RRC_CONNECTED mode of operation is configured with radio resource management (RRM) measurements and reporting criteria to ensure that the base station is always informed about the current link quality to itself and alternative base stations. RRM involves strategies and algorithms for controlling (primarily physical layer) parameters such as transmit power, handover criteria, modulation and coding scheme, error coding, etc. The objective is to utilize the limited radio-frequency spectrum resources and radio network infrastructure as efficiently as possible. Measurement reporting may be a continuous process or event triggered.

Minimization of Drive Tests (MDT) is a feature introduced in 3GPP Rel-10 that enables operators to utilize users' equipment to collect radio measurements and associated location information, in order to assess network performance while reducing the operational expenditure, OPEX, associated with traditional drive tests. With MDT the network is enabled to configure measurements that do not relate to the maintenance of an on-going connection between eNodeB and UE (as in the scope of RRM). Instead, MDT configures the UE for measurement collection and related reporting that suits the operator's long-term network management. The focus of MDT in 3GPP Rel-10 was coverage optimization. However, in the increasingly complex wireless packet data networks of today, performance is affected by many different factors and cannot easily be estimated by simple radio measurements. Therefore, in 3GPP Rel-11, MDT was enhanced in order to provide a more complete view of network performance by adding Quality of Service (QoS) verification to the focus of MDT.

A mobile network operator, MNO, needs to ensure that its infrastructure nodes (e.g., base stations, relay nodes, remote radio heads) are connected to the corresponding peer entities (e.g., core network, other base stations, other relay nodes) via backhaul and/or fronthaul connections that are suited to support the demands of the deployed radio access technology (RAT). In most cases infrastructure nodes are integrated into the MNO's infrastructure via cables. While in the past years (with focus on voice calls) DSL connectivity was sometimes sufficient, nowadays (with focus on multimedia content and the ever-increasing demand for high data rates) fibre optics are primarily deployed to guarantee a satisfyingly high data rate between the infrastructure nodes involved. However, wired backhaul/fronthaul links are expensive and inflexible.

If a wireless backhaul/fronthaul link is deployed according to state-of-the-art, access links and backhaul/fronthaul links operate in different frequency bands and require separate antenna systems: The antenna system for the wireless backhaul/fronthaul link is usually a highly directive line-of-sight connection using a static parabolic reflector (i.e. a dish) that is adjusted manually when the site is being setup. In some scenarios, a wireless solution according to state-of-the-art may be less expensive than the use of cables, but it is still very inflexible.

If big sporting or entertainment events require better network coverage or more capacity, MNOs may choose to setup additional mobile base stations at the respective venue temporarily (i.e. on a per need basis). These mobile base stations are sometimes equipped with their own power supply (e.g., in form of a Diesel engine), often installed on trailers, and carried to the location of interest. They can be connected to the MNO's infrastructure via static parabolic reflector (so-called "dishes"). Adjusting such a dish manually is a very time-consuming task and costly in terms of labour, as it can only be performed by human personnel. Automated Set-Up/Maintenance of wireless backhaul/fronthaul links is not known today.

As far as the connection between a RN and its serving DeNB is concerned according to 3GPP LTE, there is a limitation that the RN cannot be positioned outside of the DeNB's coverage area. After all, the RN has to be able to pick up the DeNB's downlink signal and request link establishment in the uplink. While the DeNB may use beam forming techniques, the RN cannot be configured with directional antenna characteristics. In the current 3GPP LTE scenarios, the RN is always configured as an omnidirectional receiver. Otherwise it would not be able to pick up the DeNB's downlink signal and subsequently connect to a DeNB. The method we propose diminishes this range limitation.

US 2014/0092885 A1 and US 2014/0301270 A1 both describe a technique for setting up UE to UE (i.e. D2D) communication in which infrastructure equipment provides assisted proximity discovery information.

The present invention provides a method of establishing a wireless communication link between two infrastructure nodes in a wireless communication system, the method comprising at a user equipment, UE, device receiving a link establishment request message transmitted by a first node; obtaining information relating to a position of the first node; and transmitting a message to a second node informing the second node of the position of the first node to assist in establishing the link between the first and second nodes.

The invention further provides a method of establishing a wireless communication link between two infrastructure nodes in a wireless communication system, the method comprising transmitting by a first node a link establishment request message to a user equipment, UE, device; receiving at a second node a message from the UE device providing the second node with position information about the position of the first node, the position information relating to a position of the first node relative to the UE device, the position information having been determined by the UE device; and using the position information to assist in establishing the link between the first and second nodes.

The deficiencies of prior art are mitigated by utilizing a UE to assist in the connection setup procedure for a directional wireless link between two infrastructure nodes.

Infrastructure nodes that are lacking a wireless backhaul link or fronthaul link can disseminate a "request for help" in their downlink signal on their respective access link, e.g. as part of their system information broadcast (SIB).

UEs can be configured by their serving infrastructure node to detect/measure a "request for help" from other (e.g., neighbouring) infrastructure nodes.

A serving infrastructure node is enabled to select suitable UEs for this operation, e.g. UEs residing at the cell edge of both the serving infrastructure node and of help-seeking infrastructure nodes. The selection can be based (at least in part) on path loss comparisons of measured downlink signals.

Other selection criteria for example based on the UE's radio capabilities or the UE's current speed/location/processing load are also possible. Letting the serving infrastructure node select a stationary (or slowly moving) UE may be beneficial in some scenarios.

The "request for help" may either be a trigger for the UE to temporarily connect to the help-seeking infrastructure node in order to retrieve a set of positioning data, or the request or the respective system information may directly contain positioning data. According to this invention the positioning data specifies the exact location of the respective infrastructure node.

If the infrastructure node in question does not provide its location, UEs can be configured to perform signal measurements and geometrical calculations thereof to derive the angle of arrival (AoA) and/or distance information.

The positioning information as received from the help-seeking infrastructure node or as determined in the UE is reported to the serving infrastructure node according to a configuration of the UE.

The serving infrastructure node uses the location information and/or the AoA and/or distance information received from the at least one UE to setup a directional wireless backhaul link or fronthaul link to the other infrastructure node that has disseminated the "request for help". The serving infrastructure node adjusts its antenna control settings accordingly.

The help-seeking infrastructure node may receive the serving infrastructure node's position via the UE, e.g. during a connection made by the UE for reception of positioning data from that node.

The delivery of positioning information between the two infrastructure nodes via the UE may be transparent to the UE, i.e. the information may be relayed by the UE without interpretation or change, the information may also be encrypted and delivered as a transparent container.

In this context, infrastructure nodes may be two base stations, two relay nodes, two remote radio heads, or combinations thereof. In case a functional split into central unit (CU) and distributed unit (DU) is defined for a given node, as currently discussed in 3GPP for the upcoming 5G radio access network (RAN), an infrastructure node may also be represented by a sub set of a base station, such as a central unit (CU) or a distributed unit (DU).

The present invention enables a dense and flexible deployment of 5G radio cells without the need for densifying the transport network proportionately.

In one embodiment of the present invention said infrastructure nodes are represented by base stations. In another embodiment of the present invention one network node is a base station and the other network node is a relay node or a remote radio head.

The invention describes a method for the initial setup of a backhaul/fronthaul link aiming at connecting an infrastructure node that is lacking a connection to the core network of a cellular communication system.

Due to the expected deployment of transmission and reception points (TRPs) that are able to support simultaneous generation of multiple beams for cellular communication systems according to 5G there is an opportunity to develop and deploy integrated access and backhaul links. This may allow easier deployment of a dense network topology and self-backhauling of 5G cells in a more integrated manner by building upon many of the control and data channels/procedures defined for providing access to UEs.

A TRP is usually associated with an infrastructure node and may be realized by an antenna system that allows concentration of radio signals towards a certain spot or into a certain direction in a flexible manner (e.g., a "phased array").

The current invention enables deployment of self-organizing infrastructure nodes outside the omnidirectional coverage area of serving base stations. It thus extends the reach of small infrastructure nodes, extends the coverage of the operator network and lowers deployment costs.

Preferred embodiments of the invention will now be described, by way of example only, with reference to the accompanying drawings in which:

FIG. 1 shows an exemplary network arrangement in which a UE connected to a first base station A receives a link establishment request LER from a second base station B for establishing a backhaul link between base stations A and B.

FIG. 2 shows an exemplary network arrangement in which a UE connected to a first base station A receives a link establishment request LER from a remote radio head TRP R for establishing a fronthaul link between base station A, acting as a base band unit for the RRH, and the RRH.

A serving infrastructure node (such as base station A) may configure the UE residing in RRC_CONNECTED mode of operation with measurements to detect and report a link establishment request (LER) received from other infrastructure nodes that are requiring assistance to setup a directional wireless backhaul link or fronthaul link. The LER may for instance be received from the other infrastructure node as part of its system information broadcast (SIB).

Two cases can be considered.
I. The Help-Seeking Infrastructure Node is Unaware of its Position In this case, the LER transmitted by the help-seeking infrastructure node only comprises a request for help and the UE(s) receiving the LER is (are) required to perform measurements on signals from that node and some geometrical operations to derive an estimated angle of arrival, as will be discussed in detail below.

Figure 1:
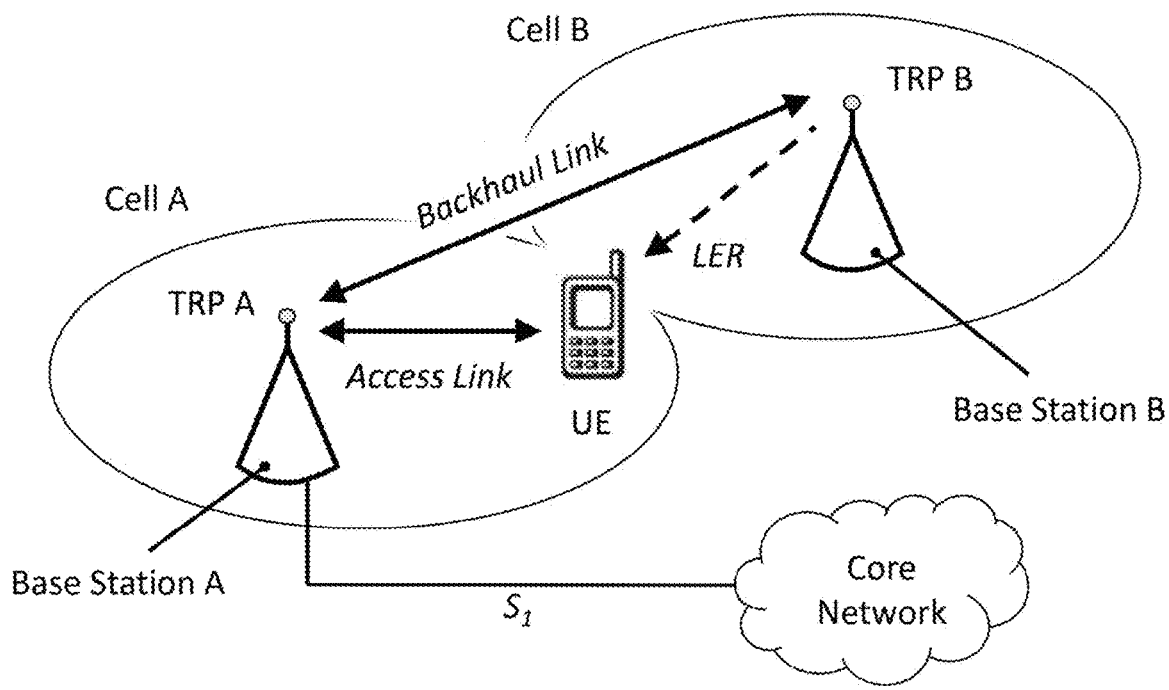
FIG. 1 shows a representation of a base station requesting an establishment of a backhaul link.
Figure 2:
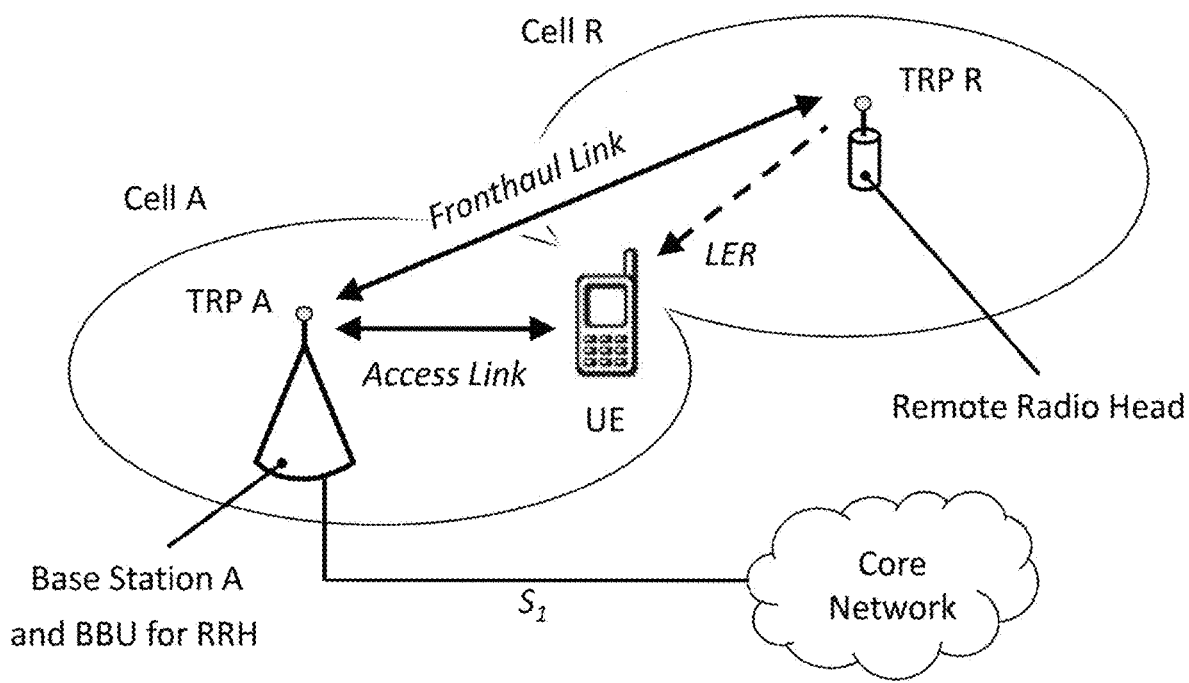
FIG. 2 shows a representation of a remote radio head requesting establishment of a fronthaul link.

It may generally be helpful to involve more than just one UE in the process of setting up the desired backhaul/fronthaul link between the involved infrastructure nodes. Thus, the serving infrastructure node (base station A in FIGS. 1 and 2) may configure multiple UEs accordingly, and then choose to combine the results received from different UEs thereby improving accuracy of the position estimate.

Furthermore, it seems beneficial to base the selection of UEs on certain selection criteria (such as UE state, UE speed, UE location, UE capability, and so on). For example, the serving infrastructure node (base station A in FIGS. 1 and 2) may select especially those UEs that are residing at cell edge for the method. Path loss measurements, or their comparison, could be used in the serving cell to select suitable cell edge UEs.

II. The Help-Seeking Infrastructure Node Knows its Position

Figure 3:
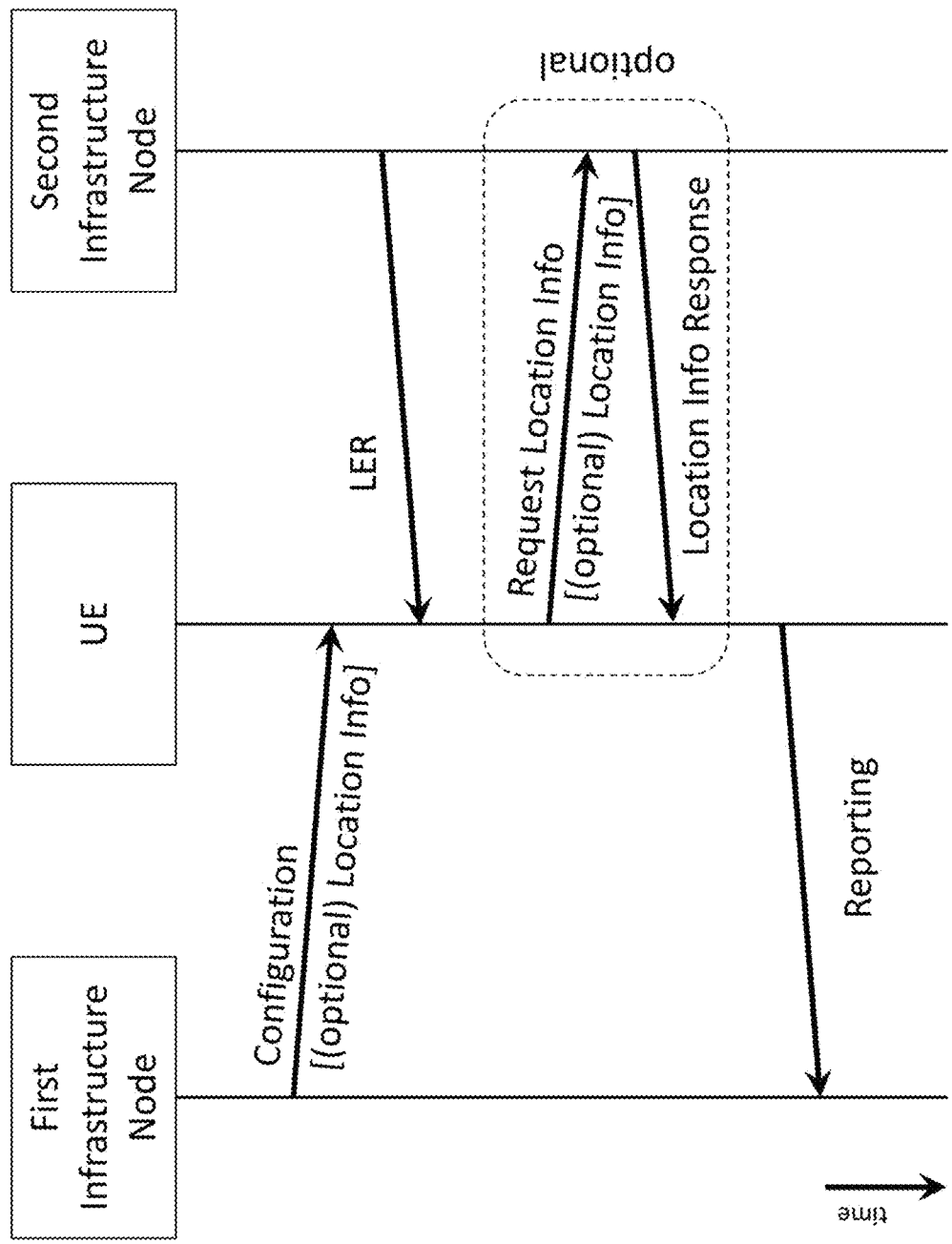
FIG. 3 is a message flow chart showing steps in establishing a link.

The LER transmitted by the help-seeking infrastructure node may comprise position data together with the request for help (cf. the basic flow of messages in FIG. 3). The positioning data may be transparent for the UE, i.e. not in a form that can be read by the UE, e.g. encrypted.

Alternatively, the LER received from the help-seeking infrastructure node via SIB in a first step is used to trigger an "RRC connection setup" attempt on the access link of this node so that further content related to the LER, such as the positioning data, can be transmitted via dedicated signalling in a second step (cf. the "optional" dashed box in FIG. 3). Suitable RRC messages to convey the desired information from the help-seeking infrastructure node to the UE are for instance the "RRC connection setup" message, or the "RRC connection reject" message (potentially together with a reject cause "waiting for backhaul link to be setup"), the "RRC DL information transfer" message, or a new kind of RRC message not yet defined in the standard. The exchange of these pieces of information at RRC layer is our preferred embodiment. However, other protocol layers and/or messages may also be used.

The established connection may also be used by the UE to provide positioning data of the serving infrastructure node to the help-seeking infrastructure node. The information may have been received from the serving infrastructure node together with a configuration, e.g. the configuration that caused the UE to react on the help signals in the first place. The location information is depicted in FIG. 3 as optional.

In both alternatives, the position data of either or both infrastructure node(s) may (in parts or in its entirety) be integrity protected and/or encrypted and/or submitted in form of a transparent container for the UE. Transparent in this context means that the UE doesn't have to understand/process the content of the transparent container. The position data is passed on to the respective receiving infrastructure node unaltered.

FIG. 3 shows an example message flow of a method according to the invention. The first infrastructure node corresponds to base station A of FIGS. 1 and 2. The UE is connected to the first infrastructure node at least during the "configuration" and "reporting" actions shown in FIG. 3. The second infrastructure node may correspond to base station B of FIG. 1, a relay node, or the RRH of FIG. 2.

In a first step, the first infrastructure node determines one or more suitable UEs. In a second step, the first infrastructure node configures the selected UEs. This configuration may be part of the normal RRM measurement configuration and/or part of MDT. The configuration may comprise provision of location information of the first infrastructure node for delivery by the UE to the second infrastructure node. The configuration may also comprise provision of additional information to be used by the second infrastructure node for establishment of a link to the first infrastructure node, e.g. link parameters, frequency information, bandwidth part (BWP) information (as defined for 5G systems, cf. FIG. 6), and current load information. The configuration may also comprise provision of location and other information of further neighbouring infrastructure nodes that potentially could serve the second infrastructure node. The location and other information provided to the UE for delivery to the second infrastructure node may be transparent to the UE.

All UEs that have been configured to report an LER (if received from neighbouring cells) enhance their measurement reporting accordingly. If the second infrastructure node is unaware of its location, the LER serves as an indication for the UE to use measurements on the LER or other signals from the second infrastructure node and perform geometrical operations aiming at deriving Angle of Arrival (AoA) and/or distance information to be sent to the first infrastructure node. The results of these operations may thus be part of the normal RRM measurement reporting and/or part of the MDT reporting mechanisms.

If the second infrastructure node knows about its location, the LER itself may contain the desired set of positioning data, or the UE may be triggered by the LER to retrieve the desired positioning data from the second infrastructure node in a subsequent process. This may require the UE to go through the random access procedure and to set up a (temporary) connection to the second infrastructure node. A potentially configured set of location and other information of the first infrastructure node may then be transmitted by the UE to the second infrastructure node. The set of positioning data and potentially other data of the second infrastructure node may be transmitted from the second infrastructure node to the UE and from there to the first infrastructure node (e.g., after the connection to the second infrastructure node has been terminated). The exchange of this information may happen at the RRC layer of the protocol stack of the access link (e.g., if the second infrastructure node is a base station or relay node). Alternatively, a different protocol or a lightweight RRC protocol is used in the second infrastructure node and the UE. If, for example, the second infrastructure node is an RRH, then the node does not have the RRC functionality of the respective air interface implemented, as the RRC protocol would only be present in the base station controlling the RRH. An RRH would thus need to support a set of messages to be exchanged between the RRH and the base station controlling the RRH to realize the current invention in addition to the legacy functionality of an RRH.

Alternatively, the LER (including the set of positioning data partially or in its entirety) is received from the second infrastructure node via broadcast signalling (e.g., as part of the cellular communication system's system information broadcast (SIB) signalling) or via dedicated signalling.

In one embodiment, detection of a LER received form a neighbour cell may serve as a trigger point for UEs residing in RRC_CONNECTED mode of operation to promptly transmit a measurement report (including the set of position data pertaining to the second infrastructure node) to its serving cell.

In a second embodiment, reception of a measurement report comprising information about a LER signal received by a UE may serve as a trigger for the first infrastructure node to order a UE (not necessarily the same UE) to release the connection to the first infrastructure node, connect to the second infrastructure, retrieve position and/or other information of the second infrastructure node and optionally provide position and/or other information of the first infrastructure node, release that connection and re-connect to the first infrastructure node to provide the retrieved position and/or other information.

In another embodiment, detection of a LER received from a neighbour cell may serve as a trigger point for UEs residing in RRC_IDLE mode of operation to promptly request a connection setup to the first infrastructure node to enable transmission of a measurement report.

In yet another embodiment, detection of a LER received from a neighbour cell may serve as a trigger point for UEs residing in RRC_IDLE mode of operation to promptly request a connection setup to the second infrastructure node to enable submission of stored positioning data of at least a first infrastructure node and/or retrieve position data from the second infrastructure node, followed by a release of the connection and connection setup to a first infrastructure node for the transmission of a measurement report.

In similar embodiment as above a UE with the ability to connect to the second infrastructure node while connected to the first infrastructure node may be configured to perform the embodiments as above without releasing a connection to the first infrastructure node.

In another aspect of this invention, the second infrastructure node that broadcasts a LER signal provides a predefined signal in its physical transmission signals, e.g. in its synchronization signals, its cell ID or similar, that indicates the node as being without a backhaul connection, thus no potential serving node for normal UEs. This may be realized by a dedicated synchronization signal only used by this kind of infrastructure node. The aim is to prevent normal UEs that are not configured to assist in infrastructure link setup to select the respective cell as candidate for cell (re-)selection or for normal neighbour cell measurements.

This section deals with the case in which the second infrastructure node does not transmit any information about its location. Here, the LER serves only as an indication for the UE to perform operations aiming at deriving Angle of Arrival (AoA) and/or distance information to be sent to the first infrastructure node.

If the first infrastructure node has information about its own and the UE's position, an exact AoA and distance measurement by the UE reported to the first infrastructure node would be sufficient to exactly determine the position of the second infrastructure node. If the measurements by the UE are not exact and may have a significant measurement error, the same measurement may be configured and performed by multiple UEs. An averaging of received measurements of different UEs would increase the position estimation accuracy.

Figure 4:
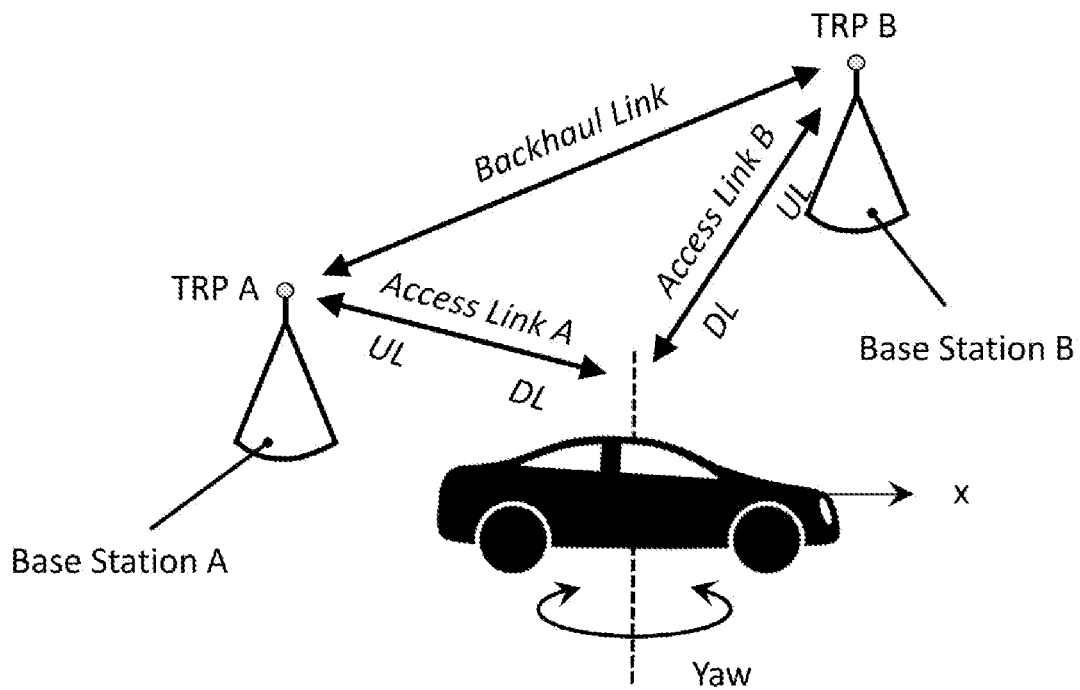
FIG. 4 is a schematic diagram showing angle of arrival measurements performed by a UE.
Figure 5:
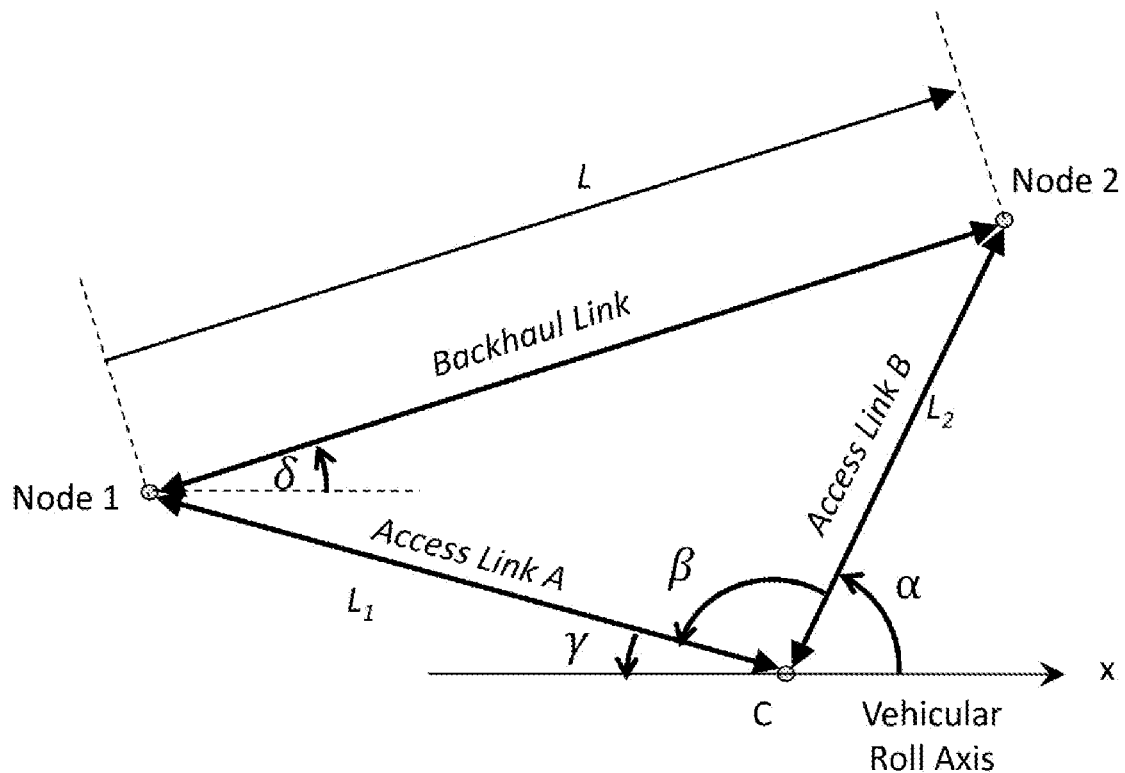
FIG. 5 shows the angles measured in FIG. 4.

If, however, the UE's position is widely unknown by the first infrastructure node, the following measurements and calculation may result in a good estimation of the position of the second infrastructure node. While we don't see a need to exclude handheld UE devices, in the detailed example below, the UE is represented by a vehicle (e.g., a car) that is equipped with a phased antenna array. FIG. 4 shows a schematic view of the arrangement and FIG. 5 depicts a simplified view form the top of the same scenario. The vehicle may or may not move in direction x along the vehicular roll axis.

The vehicle's roll axis was arbitrarily selected to serve as the system's ledger (or, base line) for all angular considerations that are described in the following. Any other definition would also allow derivation of AoA information in the scope of the present invention. It is noteworthy to mention that our consideration described here are related to a two-dimensional plane projected on the surface of the earth; hence the top view in FIG. 5. Height aspects (three-dimensional calculations) are not described in detail for sake of brevity.

The UE receives downlink signals from both infrastructure nodes and uses its antenna array to analyze the received signals for the respective angle of arrival (AoA) of the signals of both nodes. In FIG. 5, the measured angles would be $\alpha$ and $\gamma$ (or $180°-\gamma$). The difference angle $\beta$ can easily be calculated. For the distance, the UE may use signal strength measurements of signals with a known (fixed) power, e.g. RSRP. The measurements will provide an estimation of the distance from UE to the node $L_1$ and $L_2$, respectively. Especially the comparison of the RSRP measurements will provide a distance ratio that allows together with the angle measurements a good estimation of the direction of the second infrastructure node seen from the first infrastructure node. According to known triangle calculation we can derive $$\delta = \text{acos}\left(\sqrt{\frac{\cos^2(\beta)}{1 + r^2 + 2r\,\cos(\beta)}}\right) - \gamma,$$

with $$r = \frac{L_1}{L_2}$$

which shows clearly that the direction of a beam from infrastructure node 1 to node 2 can be calculated using the difference angle $\beta$ and the ratio r of the two received links estimated by the ratio of the two respective receive signals.

If this estimation is repeated by multiple UEs residing in an adequate area to participate in the estimation but at significantly different positions, the result will be a direction estimation that is well suitable for the first infrastructure node to adjust its antenna arrays and direct its transmit and receive beams towards the second infrastructure node.

This estimation or the measurements may also be provided as a measurement report to the second infrastructure node so that both infrastructure nodes can direct their radio beams towards each other. In one embodiment, this reporting could be part of the connection setup procedure between the UE and the second infrastructure node, i.e. the estimation operation described above would be performed upon reception of (i.e. triggered by) the LER indication but before the UE starts connecting to the second infrastructure node (or, reporting to the first infrastructure node).

An additional aspect of this invention is the transmission of information regarding the second infrastructure node (e.g., the set of position data pertaining to the second infrastructure node) in combination with the position and potentially other information from the first infrastructure node to further neighbouring infrastructure nodes via CN connections. This allows multiple infrastructure nodes to potentially act as the serving node for the second infrastructure node and it prevents the procedures described to be necessary for every potentially serving node. For that purpose, the first infrastructure node informs its neighbours or the subset of those which reside in a relevant area about the LER signal and the set of position data pertaining to the second infrastructure node.

With the above mentioned LER indication from the second infrastructure node and a position data provision by the UE to the first and optionally also to the second node, the nodes have position or at least direction information of each other.

Again, we have to distinguish two cases depending on whether the second help-seeking infrastructure node connected to the UE during the former procedure or not.

If the position estimation was done solely between the UE and its serving infrastructure node, the second infrastructure node is not aware of the UE actually helping. As a result, only the first infrastructure node or any of its neighbour nodes informed in addition may react on the received information.

The first infrastructure node (or any of its informed neighbours) directs its receive antenna beam(s) to the estimated position of the second infrastructure node to be able to receive any information transmitted by that node. Also, the transmit antenna beam(s) is/are directed into the same direction, initially for transmission of the cell broadcast signals, i.e. synchronization signals and system information broadcast, to enable the second infrastructure node to detect the first node (or its neighbours).

The first infrastructure node may also initiate a link establishment by performing a random access attempt at the second infrastructure node using radio beams directed towards the second infrastructure node. This requires the first infrastructure node to act as a UE for initial link establishment.

If the second infrastructure node was involved in the position estimation procedure and gained knowledge of the first infrastructure node's position, then the second infrastructure node may choose to direct its radio beams towards the first infrastructure node in order to detect the first infrastructure node, receive random access attempts from the first infrastructure node, respond to random access attempts received from the first infrastructure node, or initiate a random access attempt from the second to the first infrastructure node. The latter is the preferred embodiment as the second infrastructure node can act as a UE anyway. From the moment a link is established between both infrastructure nodes, well known open or closed loop mechanisms will be used to sharpen the radio beams between the two infrastructure nodes involved and increase the link quality. However, without the help of a UE between the two infrastructure nodes, the establishment of a link would not have been possible.

Figure 6:
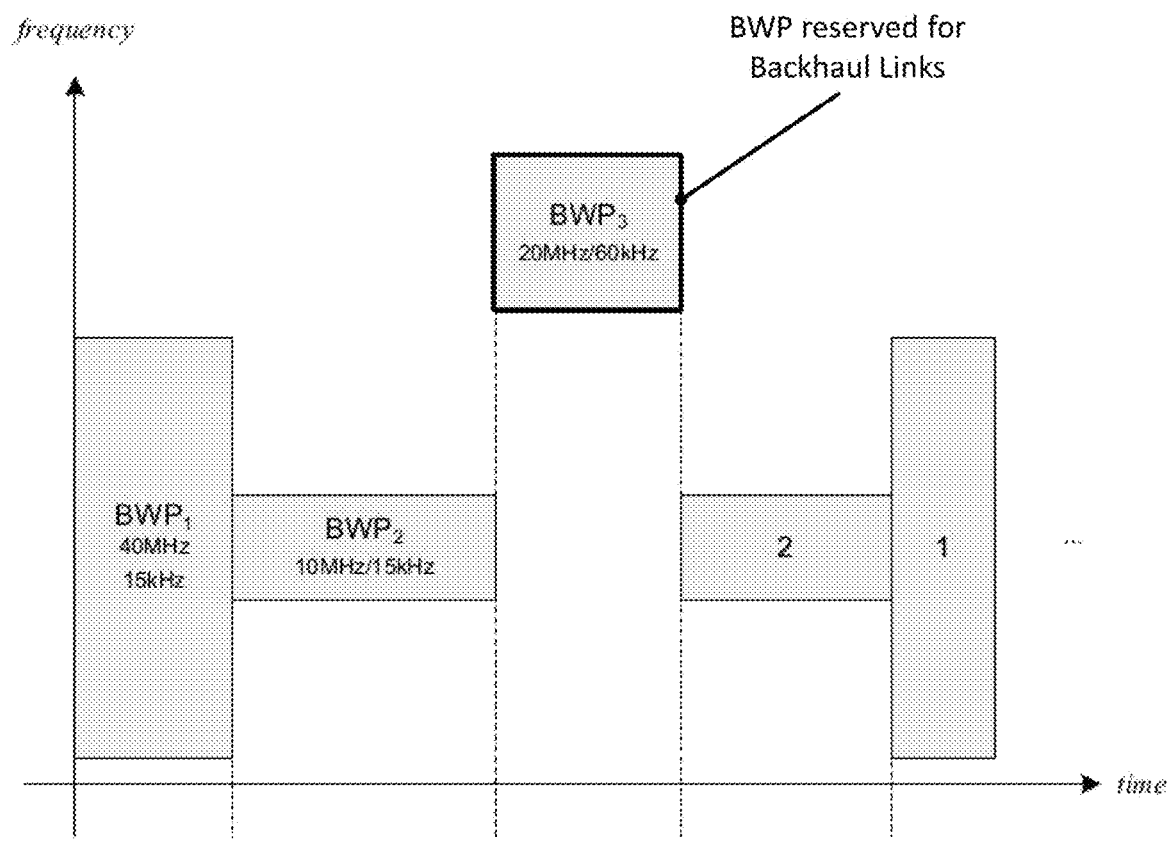
FIG. 6 shows different Bandwidth Parts (BWPs) located in the time-frequency resource lattice of a 5G communication system according to 3GPP TS 38.300.

In one embodiment, the data exchanged in preparation of the link establishment procedure between the two infrastructure nodes according to the teachings of this invention may comprise information relating to the usage of a distinct bandwidth part (BWP) that may be reserved inside the radio resource grid of the wireless communication system for exclusive use by fronthaul or backhaul links. For instance, said distinct BWP may be a portion of the time-frequency resource lattice of a 5G wireless communication system, as shown in FIG. 6, and may in some scenarios have a numerology other than the bandwidth parts used for access links.

In the present invention a user equipment, UE, device is often mentioned as an example device for assisting in the connection setup procedure for a direction-oriented radio link between two infrastructure nodes in a wireless communication system. This choice of terminology is not meant to be a general restriction to mobile terminals, cell phones or similar handheld devices. Instead, the term "user equipment, UE, device" as used in the present document shall rather be understood as a term for any intermediate device that can assist two or more infrastructure nodes in performing the described procedures. For example, in various embodiments of the present invention it can be a mobile or stationary device, run on battery or be connected to the power grid, user controlled or under control of a network operator, a typical cell phone or a cellular modem embedded in some kind of IoT device or vehicle. It can even be a third infrastructure node (for example residing in the domain of a mobile network operator) supporting a multitude of wired and/or wireless interfaces.

What is claimed is:

1. A method of establishing a wireless communication link between two nodes in a wireless communication system, the method comprising at a user equipment, UE, device:
   receiving a link establishment request message transmitted by a first infrastructure node;
   obtaining information relating to a position of the first infrastructure node; and
   transmitting a message to a second infrastructure node informing the second infrastructure node of the position of the first infrastructure node to assist in establishing the link between the first and second infrastructure nodes.

2. The method according to claim 1, wherein the UE device receives location information from the first infrastructure node.

3. The method according to claim 2, wherein the UE device receives the location information with the link establishment request message.

4. The method according to claim 2, wherein the UE device receives the location information after a connection has been established between the UE device and the first infrastructure node.

5. The method according to claim 2, wherein the location information is received as information within a message container which is forwarded by the UE device to the second infrastructure node.

6. The method according to claim 1, wherein the UE device determines the positional information of the first infrastructure node by analysing signals received from the first infrastructure node.

7. The method according to claim 1 wherein the UE device transmits to the first infrastructure node position information of the second infrastructure node.

8. A method of establishing a wireless communication link between two infrastructure nodes in a wireless communication system, the method comprising:
   transmitting by a first infrastructure node a link establishment request message to a user equipment, UE, device;
   receiving at a second infrastructure node a message from the UE device providing the second infrastructure node with position information about the position of the first infrastructure node, the position information relating to a position of the first infrastructure node relative to the UE device, the position information having been determined by the UE device; and
   using the position information to assist in establishing the link between the first and second infrastructure nodes.

9. The method according to claim 8, wherein the first infrastructure node transmits location information to the UE device.

10. The method according to claim 9, wherein the first infrastructure node transmits the location information with the link establishment request message.

11. The method according to claim 9, wherein the first infrastructure node transmits the location information after a connection has been established between the UE device and the first infrastructure node.

12. The method according to claim 9, wherein the location information is transmitted as information within a message container for forwarding by the UE device to the second infrastructure node.

13. The method according to claim 8, wherein the UE device is enabled to determine the position of the first infrastructure node by analysing the signals received from the first infrastructure node.

14. The method according to claim 13 wherein the second infrastructure node receives positional information from a plurality of UE devices and determines a position of the first infrastructure node therefrom.

15. The method according to claim 1, wherein the second infrastructure node is enabled to indicate in its downlink transmissions whether it is an infrastructure node that is currently lacking a connection into the operator's core network.

16. The method according to claim 15, wherein the second infrastructure node is enabled to indicate by means of physical layer signals whether it is an infrastructure node that is currently lacking a connection into the operator's core network.

17. The method according to claim 1, wherein the link between the first and second infrastructure node is established in a pre-defined bandwidth part of a time frequency resource grid.

18. The method according to claim 11, wherein the location information is transmitted as information within a message container for forwarding by the UE device to the second infrastructure node.

19. The method according to claim 8, wherein the second infrastructure node is enabled to indicate in its downlink transmissions whether it is an infrastructure node that is currently lacking a connection into the operators core network.

20. The method according to claim 8, wherein the link between the first and second infrastructure node is established in a pre-defined bandwidth part of a time frequency resource grid.

* * * * *